United States Patent
Baker et al.

(10) Patent No.: US 9,544,368 B2
(45) Date of Patent: Jan. 10, 2017

(54) EFFICIENT CONFIGURATION COMBINATION SELECTION IN MIGRATION

(71) Applicant: INTERNATIONAL BUSINESS MACHINES CORPORATION, Armonk, NY (US)

(72) Inventors: John K. Baker, Taylorsville, UT (US); Moises I. Galvan, Austin, TX (US); Yunwu Huang, Chappaqua, NY (US); Matthew A. Markley, Hays, KS (US); Amitkumar M. Paradkar, Mohegan Lake, NY (US); Venkata Vinay Kumar Parisa, Charlotte, NC (US); Birgit M. Pfitzmann, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 14/184,284

(22) Filed: Feb. 19, 2014

(65) Prior Publication Data
US 2015/0237129 A1    Aug. 20, 2015

(51) Int. Cl.
*H04L 12/24*    (2006.01)
*H04L 29/08*    (2006.01)

(52) U.S. Cl.
CPC ........... *H04L 67/1095* (2013.01); *H04L 41/08* (2013.01); *H04L 41/0823* (2013.01); *H04L 67/10* (2013.01)

(58) Field of Classification Search
None
See application file for complete search history.

(56) References Cited

U.S. PATENT DOCUMENTS

| 7,062,478 | B1* | 6/2006 | Huelsman | G06Q 10/06 706/47 |
| 8,229,999 | B2 | 7/2012 | Devarakonda et al. | |
| 2008/0065357 | A1* | 3/2008 | Alderman | G06F 17/50 703/1 |
| 2010/0023516 | A1* | 1/2010 | Thorpe | G06F 17/30038 707/E17.108 |
| 2010/0141948 | A1* | 6/2010 | Cohen | G01B 11/0625 356/369 |
| 2011/0009996 | A1* | 1/2011 | Liu | G06Q 10/06 700/105 |
| 2012/0089396 | A1* | 4/2012 | Patel | G10L 25/00 704/249 |

(Continued)

OTHER PUBLICATIONS

Choi, Sumi, Jonathan Turner, and Tilman Wolf. "Configuring sessions in programmable networks." Computer Networks 41.2 (2003): 269-284.*

(Continued)

*Primary Examiner* — Scott B. Christensen
*Assistant Examiner* — Sean Concannon
(74) *Attorney, Agent, or Firm* — Tutunjian & Bitetto, P.C.; Louis J. Percello

(57) ABSTRACT

Methods and systems for finding a migration target include building a constrained, layered graph from a catalog of possible configuration combinations and a distance function for each layer in the graph; and determining an available path through the graph, said path having a minimum overall distance from a source instance, by performing an optimized search that selectively evaluates available paths through the graph based on cumulative distances of paths through the graph from the source instance.

20 Claims, 4 Drawing Sheets

(56) References Cited

U.S. PATENT DOCUMENTS

| | | | |
|---|---|---|---|
| 2012/0131567 A1 | 5/2012 | Barros et al. | |
| 2012/0232864 A1 | 9/2012 | Devarakonda et al. | |
| 2012/0304179 A1 | 11/2012 | Devarakonda et al. | |
| 2012/0311154 A1 | 12/2012 | Morgan | |
| 2015/0020059 A1* | 1/2015 | Davis | G06F 9/4862 717/171 |
| 2015/0234935 A1* | 8/2015 | Gu | G06F 17/30958 707/756 |

OTHER PUBLICATIONS

Jung, Gueyoung, et al. "A cost-sensitive adaptation engine for server consolidation of multitier applications." Middleware 2009. Springer Berlin Heidelberg, 2009. 163-183.*

Xu, Jielong, et al. "Survivable virtual infrastructure mapping in virtualized data centers." Cloud Computing (CLOUD), 2012 IEEE 5th International Conference on. IEEE, 2012.*

Felner, Ariel. "Position Paper: Dijkstra's Algorithm versus Uniform Cost Search or a Case Against Dijkstra's Algorithm." Fourth Annual Symposium on Combinatorial Search. 2011.*

Zou, Lei, and Lei Chen. "Dominant graph: An efficient indexing structure to answer top-k queries." Data Engineering, 2008. ICDE 2008. IEEE 24th International Conference on. IEEE, 2008.*

Boleman, J., et al. "IBM Smartcloud Entry 2.4 Deployment Use Cases" www.ibm.com/rebooks. Feb. 2013. (88 Pages).

Filepp, R., et al. "Image Selection as a Service for Cloud Computing Environments" 2010 IEEE International Conference on Service-Oriented Computing and Applications (SOCA). Dec. 2010. (8 Pages).

International Business Machines Corporation. "Smartcloud" www.ibm.com. Oct. 2012. (48 Pages) Available at: https://www-950.ibm.com/events/wwe/grp/grp037.nsf/vLookupPDFs/Doug_B2/$file/Doug_B2.pdf.

Markley, M., et al. "Management Infrastructure Analysis for Cloud Migration" U.S. Appl. No. 13/689,500, filed Nov. 2012. (165 Pages).

Perng, C., et al. "Universal Economic Analysis Methodology for IT Transformations" 2012 IEEE Network Operations and Management Symposium (NOMS): Short Papers. Apr. 2012. pp. 558-561.

Quintero, D., et al. "IBM Platform Computing Solutions" www.ibm.com/rebooks. Dec. 2012. (370 Pages).

Salsburg, M. "The Perfect Storm for Enterprise-Class Clouds" Unisys Corporation. Jun. 2009. pp. 1-11.

Tran, V., et al. "Size Estimation of Cloud Migration Projects With Cloud Migration Point (CMP)" ESEM 2011 5th International Symposium on Empirical Software Engineering and Measurement. Sep. 2011. (8 Pages).

* cited by examiner

EFFICIENT CONFIGURATION COMBINATION SELECTION IN MIGRATION

BACKGROUND

1. Technical Field

The present invention relates to workload migration, and more particularly to finding a best target configuration combination for migrating a workload into a cloud.

2. Description of the Related Art

A significant impediment to adopting cloud computing solutions is migrating existing workloads to the target cloud (or clouds). Because most clouds typically offer a limited combination of configurations, such as virtual machines, operating systems (OSes) and middleware software, not all workloads can be directly migrated to the target cloud in their original state. Servers in some workloads may have a combination of OSes, middleware, and applications that does not match any of the available combinations of cloud configurations. If those servers are to be migrated to the target cloud, they would need changes such as software upgrades, deletion, installation, or reinstallation to become compatible with at least one combination of configurations supported by the target cloud.

A workload server can potentially become compatible with multiple combinations of target cloud configurations by going through different changes. Existing tools to accomplish this enumerate each configuration combination, which becomes very inefficient as the number of different possible combinations increases.

SUMMARY

A method for finding a migration target includes building a constrained, layered graph from a catalog of possible configuration combinations and a distance function for each layer in the graph; and determining an available path through the graph, said path having a minimum overall distance from a source instance, by performing an optimized search that selectively evaluates available paths through the graph based on cumulative distances of paths through the graph from the source instance.

A system for finding a migration target includes a structured configuration combination graph module configured to build a constrained, layered graph from a catalog of possible configuration combinations that includes a distance function for each layer of the graph; and a distance evaluation module comprising a processor configured to determine an available path through the graph, said path having a minimum overall distance from a source instance, and to perform an optimized search that selectively evaluates available paths through the graph based on cumulative distances of paths through the graph from the source instance.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide tools that can analyze all combinations of configurations supported by a target cloud or other IT environment, such as the strategic architecture of an enterprise. The present embodiments further analyze the current configurations of a particular workload server and find the best combination of target cloud configurations with which the server can become compatible by going through a set of changes respective to the chosen combination.

Figure 1:
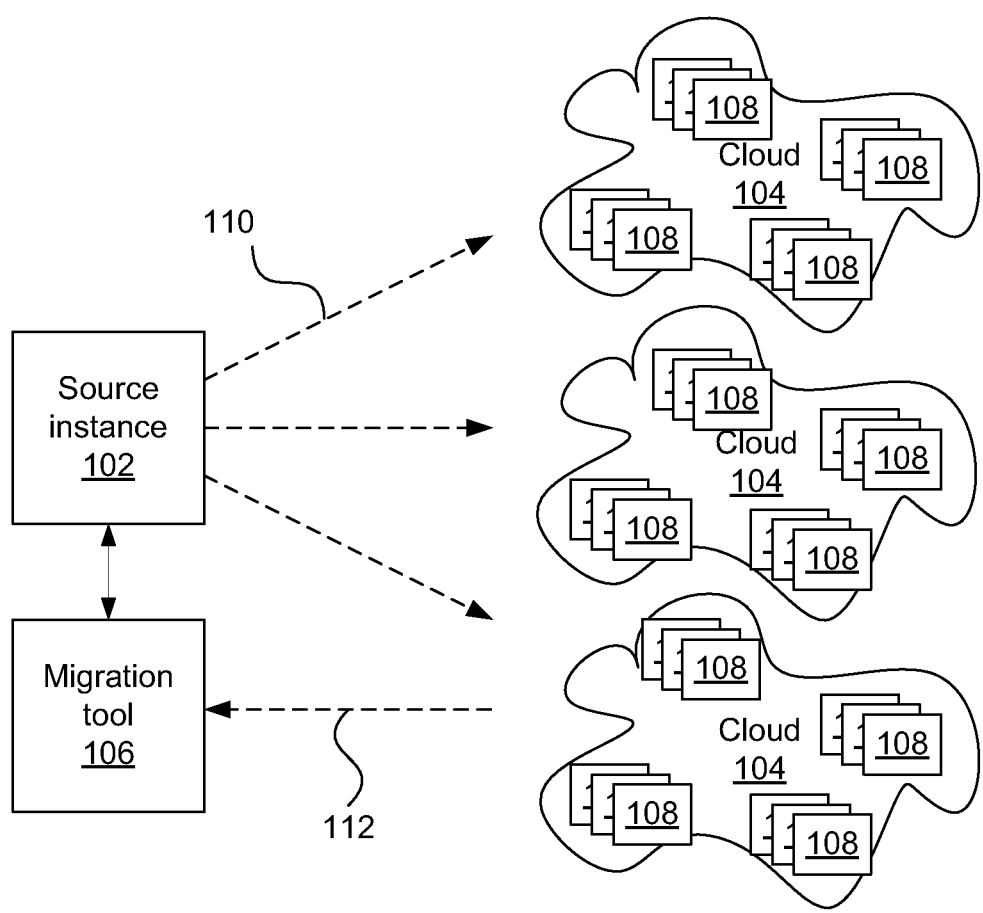
FIG. 1 is a diagram of a migration from a source instance to a cloud using a migration tool in accordance with the present principles.

Referring now to the drawings in which like numerals represent the same or similar elements and initially to FIG. 1, an exemplary migration is shown. A workload source instance 102 belongs to one or more workloads to be migrated to a cloud computing solution. As described herein, the terms "source instance" and "server" are used interchangeably, but it should be understood that a source instance may represent other embodiments. There are multiple possible cloud configuration combinations 108 belonging, in this example, to multiple clouds 104. Each possible cloud configuration combination represents a different combination of factors including hardware, middleware, and applications. A migration tool includes descriptions of the different cloud configuration combinations 108 and communicates with the source instance 102 to determine what the best cloud configuration combination 108 is for the source instance 102. The potential migrations are shown as 110 and configuration information received by the migration tool 106 from the clouds 104 is shown as 112.

In a cloud 104, there is typically a service catalog that describes images that one can provision in the cloud, SLAs associated with them, costs, etc. Each of these images may correspond to a cloud configuration combination 108. Early clouds had simple catalogs, e.g., a list of images with OS name, version, and size. Now there can be many information dimensions such as additional software, security zones, patch management schedules, availability, provisioning speed. Some dimensions may have dependencies, while others can take all of their values independently. The result is a large and potentially very complex set of possible configuration combinations.

The migration tool 106 builds a layered graph or constraint system to represent a catalog of cloud configuration combinations 108, where each layer corresponds to one information dimension. Each dimension is assigned a distance function that represents costs and/or benefits if the value of a source instance 102 in that dimension is changed to the value of the target node. The migration tool 106 then performs a best-first search on the graph or constraint system to find one or more best-suited configuration combinations for a given source instance 102.

For the purposes of the present embodiments, the term "instance" should be understood as an operating system instance together with all software running on the operating system. The instance may be physical (i.e., running directly on a server) or virtual (i.e., running through a hypervisor).

To reduce the computational overhead of searching through a very large number of possibilities, the migration tool 106 may represent independent dimension sets in separate graphs and may build the layered graph or constraint system such that dimensions that cause high variability in migration costs are evaluated in early layers, thereby reducing the expected complexity of evaluating subsequent layers. In this way, complex image catalogs can be evaluated without computing the migration costs and benefits of each possible target.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 2:
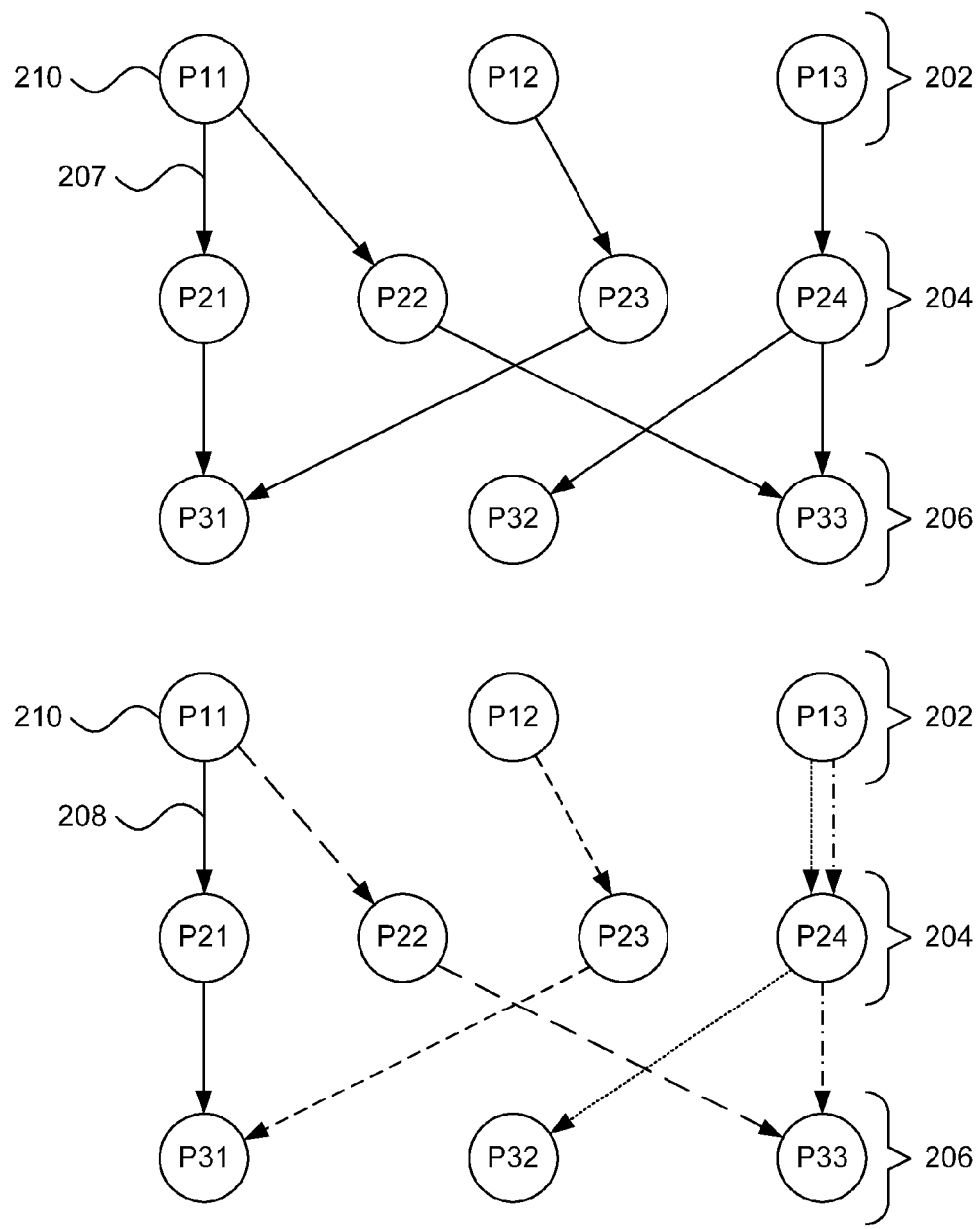
FIG. 2 is a diagram of a layered graph that, together with distance information for different migration dimensions, enables a best-first search in accordance with the present principles.

Referring now to FIG. 2, an exemplary set of configuration combinations is shown as a layered graph. The graph is organized into rows 202, 204, and 206, each of which represents a different dimension. So, in one exemplary embodiment, dimension 202 might represent software application availability, row 204 might represent operating system, and row 206 might represent hardware options. Each row has a set of different possible configurations 210 for the dimension. The first occurrence shows the actual graph, with edges 207 between nodes. The second occurrence shows the resulting paths 208. A path is a set of edges from the first layer to the last layer where each edge starts with the node where the previous edge ended. In this example, the graph is rather sparse and only 2 paths overlap in one edge (between node P13 and node P24); in larger graphs such overlaps may be more common.

The nodes 210 in the graph are connected via lines 207 such that each path through the graph represents a possible target configuration combination and, similarly, all target configuration combinations are represented by such paths. Each path is shown in the figure as a different type of line. For example, a single path 208 might start at P11 and progress through P21 to P31, and thus P11, P21, P31 are a cloud configuration combination. Meanwhile the path P11, P23, P31 does not exist in the graph and is not a cloud configuration combination. Because this is a layered graph, the edges of the paths may only lead from a layer i to a layer i+1.

Each dimension (layer) 202, 204, 206 of the graph may have an associated distance function that represents a cost/benefit when changing from a source value (configuration) to a target value (configuration). The cost may represent, e.g., an actual dollar cost, or may include any other type of cost or benefit. These values are referred to herein as distances, designated by a two-value function that accepts a source and a target value. The function that assigns distance values will often have contributions from multiple aspects, such as estimated migration cost for the dimension, steady-state cost of the target node value, and the negative of a strategic weight given to the target node value. The distance functions can be written as $d_i(x,y)$ for level i, where x and y represent source and target values. For example, the distance function may take two operating system versions (e.g., Windows 2000 and Windows 2003) and provide an associated distance value for transitioning between the two that captures cost information. Another function may capture the exclusions for distance functions, described in more detail below, where the exclusion function returns values of zero or infinity depending on whether the node is possible along a given path.

The distance function associates a value with a particular change in a specific dimension. The "change" in a dimension here means the projection of a source value to a different target value. This value can be used to model the cost of its associated change. An exact match means there is no change, hence will have a distance of 0. For all possible changes, an implementation can be a table (see Table 1 below) that includes columns such as "dimension," "source value," "target value," and "distance." Thus each row in said table represents a potential change of a configuration in the dimension (graph layer) identified in the "dimension" field from the "source value" field to the "target value" field, while incurring a cost modeled by the "distance" field.

TABLE 1

| Dimension | Source value | Target value | Distance |
| --- | --- | --- | --- |
| OS version | Windows 2000 | Windows 2000 | 0 |
| OS version | Windows 2000 | Windows 2003 | 12 |
| OS version | Windows 2000 | Windows 2008 | 15 |

The actual value of the "distance" for each possible change in a dimension can be determined by experts knowledgeable in the effort required to perform such changes. For example, the change of the OS version dimension from the source value of "Windows 2000" to the target value of "Windows 2003", can have a distance of 12, indicating the medium cost of such a change. For another example, the change of the OS version dimension from the source value of "Windows 2000" to the target value "Windows 2008" can have a distance of 15, indicating the higher cost of such a change. For yet another example, the change of the OS version from the source value of version 2008 to the target value of version 2003 is considered a downgrade and is not allowed by the distance system. In this case its associated distance can be infinity or, more practically, 99999 or some appropriate maximum integer value, indicating the infeasibility for such a change. The dimension of OS name may have higher distances than OS version because the cost of changing from a first OS to an entirely different OS is higher than changing the version of the same OS. As a further example, a change in the dimension of number of processors may have higher distances than a change in the dimension of the disk size, because the cost of changing the number of processors is higher than that of changing the disk size.

It should be noted that negative distances are not permissible in the best-first search, which follows only those paths which are locally optimal. In other words, by choosing only the path that has the lowest cumulative distance value of all paths encountered so far, a number of clearly sub-optimal possibilities can be skipped. If the possibility of a large negative distance exists in another path, then it is no longer a safe assumption to assume that an unexplored path will have a greater distance from the source based solely on the nodes the search has seen so far. In the case where a given source-to-target change may provide a benefit, effectively decreasing the overall distance of a path from the given source, the graph distances can be renormalized by setting the negative value to zero and increasing the distances in all other dimensions accordingly.

Using the example of FIG. 2, consider that evaluating the distance function for a certain source instance to each node in that graph, one would obtain the values shown below in Table 2 for the nodes 210, where "Node x" represents the $x^{th}$ node from the left in the figure. Note, however, that not all of these distance function evaluations will actually be made during the actual best-first search, only those that lie on the best path and the direct alternatives considered in the search.

TABLE 2

|  | Node 1 | Node 2 | Node 3 | Node 4 |
| --- | --- | --- | --- | --- |
| Dimension 1 | 1 | 2 | 6 |  |
| Dimension 2 | 0 | 4 | 3 | 4 |
| Dimension 3 | 2 | 0 | 1 |  |

Thus passing through any given node incurs the listed "distance" between the source value and the value of that node. Using a layered graph allows the use of a best-first search. To perform this search, one begins at the first layer 202 and finds the minimum distance. In this case, that minimum value corresponds to P11 with a distance of 1. When moving to layer 204, the search follows one of the possible paths, leading to the possible next nodes being P21 and P22. Of these, the minimum distance from the given source instance is the distance to P21. Its distance of 0 adds to the total distance of the path from the source instance, leaving a sum of 1.

At each step of the search, the overall distances of the alternatives are also stored. So at this stage, P12 is stored with a distance of 2, P13 is stored with a distance of 6, and the path P11-P22 is stored with a distance of 5. Moving from P21 to the third layer 208 has only a single option: P31 with a distance of 2. Adding this to the running total would result in a path distance of 3. There are now potentially better paths than P11-P21-P31, because the stored P12 path has a distance of only 2, less than the current running total. So P11-P21-P31 is stored with a distance of 3 and the search follows P12.

Going from P12 to P13 gives a total path distance of 5. This distance is compared to the other stored distances, and it is no longer the minimum. As such, processing returns back to the P11-P21-P31 path with its overall distance of 3. Because the third layer 206 is the final dimension to consider, this path is returned as the path with the minimum distance. In the case of a tie, all of the tied configuration combinations may be output. None of the unexplored paths can have a lower total "distance" than this path. In a realistic example, the number of possible configuration combinations can grow very quickly, making the ability to prune large portions of the graph, as this best-first search does, a substantial benefit.

Determining the distance function for a given dimension can be performed according to any appropriate method. For a given dimension with numeric values, such as memory size, a configurations smaller than the source instance will have a functionally infinite distance from the source instance to indicate that it is not possible, corresponding to an impermissible downgrade. If the source instance matches a configuration along a given dimension, then that corresponds to a distance of zero on that layer. Steady state costs of a dimension can also be accounted for, where the distance between a source value and a given node may correspond to the difference in steady state costs between the node and the source value in a certain time frame. The distance may also take into account one-time migration costs. For example, increasing a number of processors may have a higher steady state cost due to an increase in power consumption, whereas changing the operating system may be dominated by migration costs. These values may be precise, objective numbers or may be estimates.

Constructing the graph takes into account dependencies between the dimensions. If two consecutive dimensions are independent, then each node in, for example, layer 202 will connect to each node of layer 204. If there are dependencies, however, such as when a given operating system requires certain hardware, then nodes in the first layer may only connect to a subset of the nodes in the second layer. The embodiments presented so far capture the constraints imposed by dependent dimensions by ordering the dimensions carefully, such that the graph deals with dependencies locally by ordering dependent layers consecutively. In this case, each node of a layer with dependencies will only connect to the nodes in the consecutive layer that satisfy the dependencies. Independent layers can be placed in any order as long as they don't rest between two dependent layers.

If some layers dominate the remaining layers, the best-first search can be further simplified. An initial set of one or more layers dominates the remaining layers when the difference between any two distances through the initial set of layers is larger than every sum of distances over the remaining layers, i.e., than the accumulated distance of every possible path.

If the first layer dominates the remaining layers, then the search need only check paths emanating from the lowest distance (from the source value) node from the first layer. If each of the initial set of layers dominates the remaining (subsequent) layers, then one would only need to follow a single path in the graph. Rather than evaluating the sums of layer distances, this makes it possible to do a lexicographic minimization of the distance vectors.

Instead of, or in addition to the layered graph discussed above, a layered constraint system may be employed. Not all sets of configuration combinations can be represented efficiently as layered graphs without, for example, duplicating values in a layer. For example, in the three-layer example shown above, if the third layer 206 depends on particular values from the first layer 202, elements of the intermediate layer 204 will need to be duplicated for each of the elements of the first layer 202. In the worst case scenario, this would involve constructing a tree having a leaf node for each possible configuration combinations.

A more general representation may be employed that accommodates such dependencies without duplication. Layers are still used, but instead of simply using edges between consecutive layers, constraints are specified for a given node regarding all the previous layers. At each node 210, any required nodes from previous layers are specified as constraints. Constraints may also include intervals or string matching patterns such as regular expressions. A best-first search is still possible using a layered constraint system, and it should be recognized that a layered graph is a special case of a constraint system.

Figure 3:
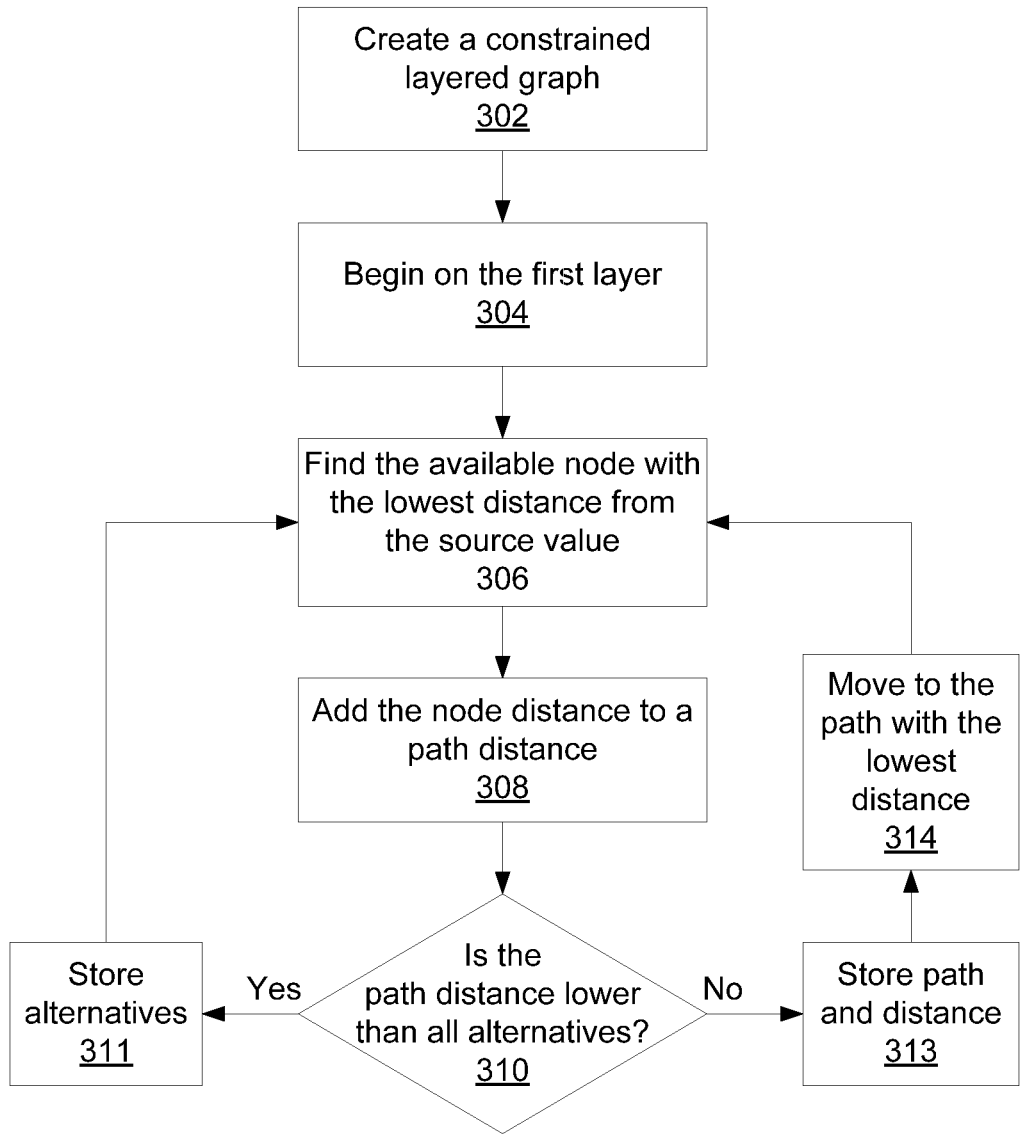
FIG. 3 is a block/flow diagram of a best-first search over a layered graph in accordance with the present principles.

Referring now to FIG. 3, a block/flow diagram of a best-first search method is shown. Block 302 forms a layered constraint system, such as the layered graph shown in FIG. 2. This can be done once in advance for each cloud 104. A corresponding distance function for each dimension may be defined even earlier for multiple clouds, or may also be done at this time. All of the possible configuration combinations 108 are characterized in the graph, with constraints between the different configurations represented as available paths. Once a source instance is given that may be migrated to a cloud, block 304 begins on the first layer 202 with a path distance of zero. Block 306 finds the available node (i.e., a node that can be reached directly from the present path; in the beginning, this is all of the nodes of the first layer) that has the lowest distance from the source value on this layer, i.e., in the dimension represented in this layer. In the case of a constraint system, block 306's check for availability further determines whether the nodes already traversed are allowed by a given node's constraints. Block 308 adds the node's distance from the source value to a total path distance and block 310 determines whether the path distance is the minimum of all the stored alternatives. If so, block 311 stores the distances of all evaluated alternative paths, including the old path together with the other nodes that could be directly reached from it. For the purposes of this consideration, a path may be any node or any sequence of nodes. Block 306 then finds the next available node with the lowest distance.

If the path distance in block 310 was higher than one or more of the stored alternatives, block 313 stores the path and distance in the set of current alternatives, and block 314 moves processing to the alternative path that has the lowest distance from the source instance so far, where it continues with block 306. This process continues until all layers have been traversed and a minimum-distance overall path has been found.

Figure 4:
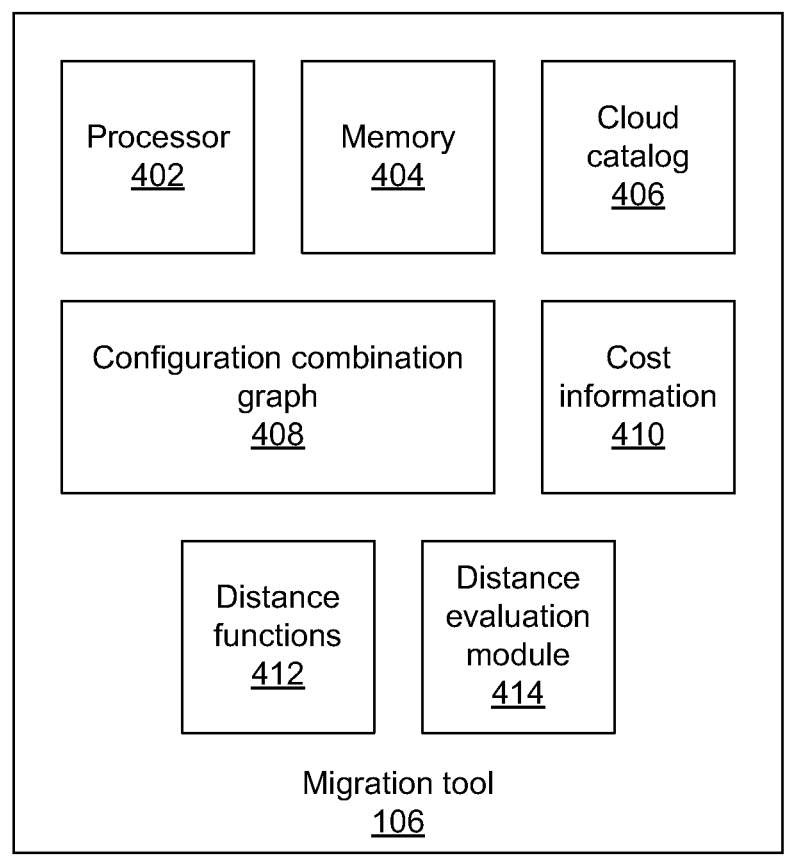
FIG. 4 is a block diagram of a migration tool for finding a target configuration combination for a source instance in accordance with the present principles.

Referring now to FIG. 4, a detailed view of migration tool 106 is shown. The migration tool may be a standalone device having dedicated hardware, or it may be implemented in software on shared hardware. The migration tool includes a processor 402 and a memory 404. The memory stores a cloud catalog 406 that includes all of the configuration options and combinations for the available cloud instances. The processor 402 uses the cloud catalog 406 to generate the structured, layered graph of the configuration combinations 408, such as that shown in FIG. 2 above.

Memory 404 also stores cost information 410 that represents historic knowledge about migration costs and that may factor in a customer's specific strategies and requirements. Processor 402 uses the cost information 410 and distance functions 412 to determine distances for the nodes of the graph 408. A distance evaluation module 414 then uses processor 402 to perform a search on the graph 408 to find the optimal configuration combination. This search may be a best-first search as described above or it may be any suitable optimized search that avoids computing distances for every path in the graph 408.

Having described preferred embodiments of a system and method for efficient configuration combination selection in migration (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for migrating a workload server configuration to a target configuration, comprising:
building a constrained layered graph from a current workload server configuration and a catalog representing a plurality of possible target configurations for a workload server,
wherein the constrained layered graph comprises a plurality of layers, each layer representing a different configuration parameter,
wherein each layer comprises an entry for each of the plurality of possible target configurations representing a change from a source configuration parameter value to a corresponding target configuration parameter value of a corresponding target configuration parameter, each entry including a distance representing a cost and benefit of changing the source configuration parameter to the corresponding target configuration parameter value;
determining an optimal path through the graph to the target configuration by, for each layer of the layered graph, selecting one of the corresponding target configuration parameters of the layer based on the distance of the corresponding target configuration parameter;
based on the determined optimal path, determining the target configuration corresponding to each selected corresponding target parameter of the plurality of layers; and
migrating the workload server configuration from the current configuration to the determined target configuration.

2. The method of claim 1, wherein determining the optimal path comprises performing a best-first search that builds paths layer-by-layer and switches to alternative paths if a current path has a higher distance.

3. The method of claim 2, wherein the best-first search comprises:
determining an available node on a current layer that has a lowest distance from the source value for this layer;
adding the distance of the lowest distance node to a path total;
adding the lowest distance node to a current path;
comparing the path total to distances of a set of stored alternatives; and
switching paths based on the comparison.

4. The method of claim 3, wherein switching paths based on the comparison comprises:
if the path total is less than or equal to the distance of each of the stored alternatives:
storing a prior path, augmented by any other available nodes from the current layer, in the set of stored alternatives; and
determining for a next layer which nodes are available based on the current path; and
if the path total is greater than the distance of any of the stored alternatives:
storing the current path in the set of stored alternatives; and
setting the current path to be the alternative with a lowest distance.

5. The method of claim 1, wherein each layer in the layered graph corresponds to a dimension of a target configuration combination representing one or more metrics used to evaluate between a specified source instance and at least one target destination, and wherein each dimension includes a set of nodes that corresponds to different possible values for a target configuration in the dimension.

6. The method of claim 5, wherein the constrained, layered graph further comprises edges connecting nodes between consecutive layers such that the possible paths correspond to possible target configuration combinations.

7. The method of claim 1, wherein the configuration combinations are target configuration combinations for cloud images.

8. The method of claim 1, further comprising building a distance function for each layer in the graph, the distance function being based on migration costs, steady state costs, and customer strategies.

9. The method of claim 8, wherein the distance function represents a cost/benefit value when changing from an initial configuration to a target configuration.

10. The method of claim 1, wherein building further comprises building a first graph of interdependent layers and building at least one graph of independent layers.

11. The method of claim 1, further comprising determining a shortest available path having a minimum overall distance from a specified source instance to at least one target destination, by performing an optimized search that selectively evaluates each of the plurality of available paths through the graph based on cumulative distances of each of the paths through the graph from the source instance, and wherein dominating layers are evaluated first, without expansion of non-optimal nodes on said dominating layers.

12. The method of claim 1, wherein each layer in the layered graph represents a unique information dimension.

13. A system for migrating a workload server configuration to a target configuration, comprising:
a migration tool configured to determine a target configuration, the migration tool including:
a structured configuration combination graph module configured to build a constrained layered graph from a current workload server configuration and a catalog representing a plurality of possible target configurations for a workload server,
wherein the constrained layered graph comprises a plurality of layers, each layer representing a different configuration parameter,
wherein each layer comprises an entry for each of the plurality of possible target configurations representing a change from a source configuration parameter value to a corresponding target configuration parameter value of a corresponding target configuration parameter, each entry including a distance representing a cost and benefit of changing the source configuration parameter to the corresponding target configuration parameter value; and
a distance evaluation module comprising a processor configured to:
determine an optimal path through the graph to the target configuration by, for each layer of the layered graph, selecting one of the corresponding target configuration parameters of the layer based on the distance of the corresponding target configuration parameter; and
based on the determined optimal path, determine the target configuration corresponding to each selected corresponding target parameter of the plurality of layers, and
wherein the migration tool is further configured to migrate the workload server configuration from the current configuration to the determined target configuration.

14. The system of claim 13, wherein the distance evaluation module is further configured to perform a best-first search that builds paths layer-by-layer and switches to alternative paths if a current path has a higher distance.

15. The system of claim 14, wherein the distance evaluation module is further configured to determine an available node on a current layer that has a lowest distance, add the distance of the lowest distance node to a path total, add the lowest distance node to a current path, compare the path total to distances of a set of stored alternatives, and switch paths based on the comparison.

16. The system of claim 15, wherein the distance evaluation module is further configured to store any other available nodes from the current layer in the set of stored alternatives and determine for a next layer which nodes are available based on the current path if the path total is less than or equal to the distance of each of the stored alternatives, and to store the current path in the set of stored alternatives and set the current path to be the alternative with a lowest distance if the path total is greater than the distance of any of the stored alternatives.

17. The system of claim 13, wherein the structured configuration combination graph module is further configured to build a first graph of interdependent layers and to build at least one graph of independent layers.

18. The system of claim 13, wherein the distance evaluation module is further configured to evaluate dominating layers first, without expansion of non-optimal nodes on said dominating layers.

19. The system of claim 13, wherein each layer in the layered graph represents a unique information dimension.

20. A computer readable storage medium comprising a computer readable program for migrating a workload server configuration to a target configuration, wherein the computer readable program when executed on a computer causes the computer to perform the steps of:
building a constrained layered graph from a current workload server configuration and a catalog representing a plurality of possible target configurations for a workload server,
wherein the constrained layered graph comprises a plurality of layers, each layer representing a different configuration parameter,
wherein each layer comprises an entry for each of the plurality of possible target configurations representing a change from a source configuration parameter value to a corresponding target configuration parameter value of a corresponding target configuration parameter, each entry including a distance representing a cost and benefit of changing the source configuration parameter to the corresponding target configuration parameter value;
determining an optimal path through the graph to the target configuration by, for each layer of the layered graph, selecting one of the corresponding target configuration parameters of the layer based on the distance of the corresponding target configuration parameter;
based on the determined optimal path, determining the target configuration corresponding to each selected corresponding target parameter of the plurality of layers; and
migrating the workload server configuration from the current configuration to the determined target configuration.

* * * * *